(12) United States Patent
Robinson

(10) Patent No.: US 10,533,540 B2
(45) Date of Patent: Jan. 14, 2020

(54) SYSTEM AND METHOD FOR CONVERTING HEAT TO KINETIC ENERGY

(71) Applicant: Shawn Robinson, Nipomo, CA (US)

(72) Inventor: Shawn Robinson, Nipomo, CA (US)

( * ) Notice: Subject to any disclaimer, the term of this patent is extended or adjusted under 35 U.S.C. 154(b) by 47 days.

(21) Appl. No.: 15/855,951

(22) Filed: Dec. 27, 2017

(65) Prior Publication Data

US 2018/0106242 A1 Apr. 19, 2018

Related U.S. Application Data

(63) Continuation-in-part of application No. 15/205,609, filed on Jul. 8, 2016, now abandoned.

(51) Int. Cl.
*F03G 7/06* (2006.01)
*G21H 3/00* (2006.01)
*F16H 7/02* (2006.01)

(52) U.S. Cl.
CPC ............... *F03G 7/06* (2013.01); *G21H 3/00* (2013.01); *F16H 7/02* (2013.01)

(58) Field of Classification Search
USPC ...................................... 250/506.1
See application file for complete search history.

(56) References Cited

U.S. PATENT DOCUMENTS

| | | | | |
|---|---|---|---|---|
| 2,931,189 A | * | 4/1960 | Sigworth | F24V 40/00 62/6 |
| 3,205,937 A | * | 9/1965 | Shyffer | B64G 1/50 165/96 |
| 3,307,783 A | * | 3/1967 | Wiebelt | B64G 1/50 236/1 R |
| 3,316,415 A | * | 4/1967 | Taylor | H02N 10/00 290/1 R |
| 3,362,467 A | * | 1/1968 | Kummerer | B64G 1/50 165/86 |
| 4,150,544 A | * | 4/1979 | Pachter | F03G 7/06 60/527 |
| 9,105,365 B2 | * | 8/2015 | Singh | G21F 5/10 |
| 9,159,985 B2 | * | 10/2015 | Nakanishi | H01M 2/348 |

\* cited by examiner

*Primary Examiner* — Phillip A Johnston
(74) *Attorney, Agent, or Firm* — Cohen IP Law Goup, P.C.; Michael N. Cohen

(57) ABSTRACT

A system for converting heat to kinetic energy is disclosed. The system may include a heat source, bimetallic bands and wheels that may support the bimetallic bands. The bimetallic bands may be heated by the heat source and may rotate the wheels. The rotation of the wheels may then be used to convert the kinetic energy to power.

16 Claims, 10 Drawing Sheets

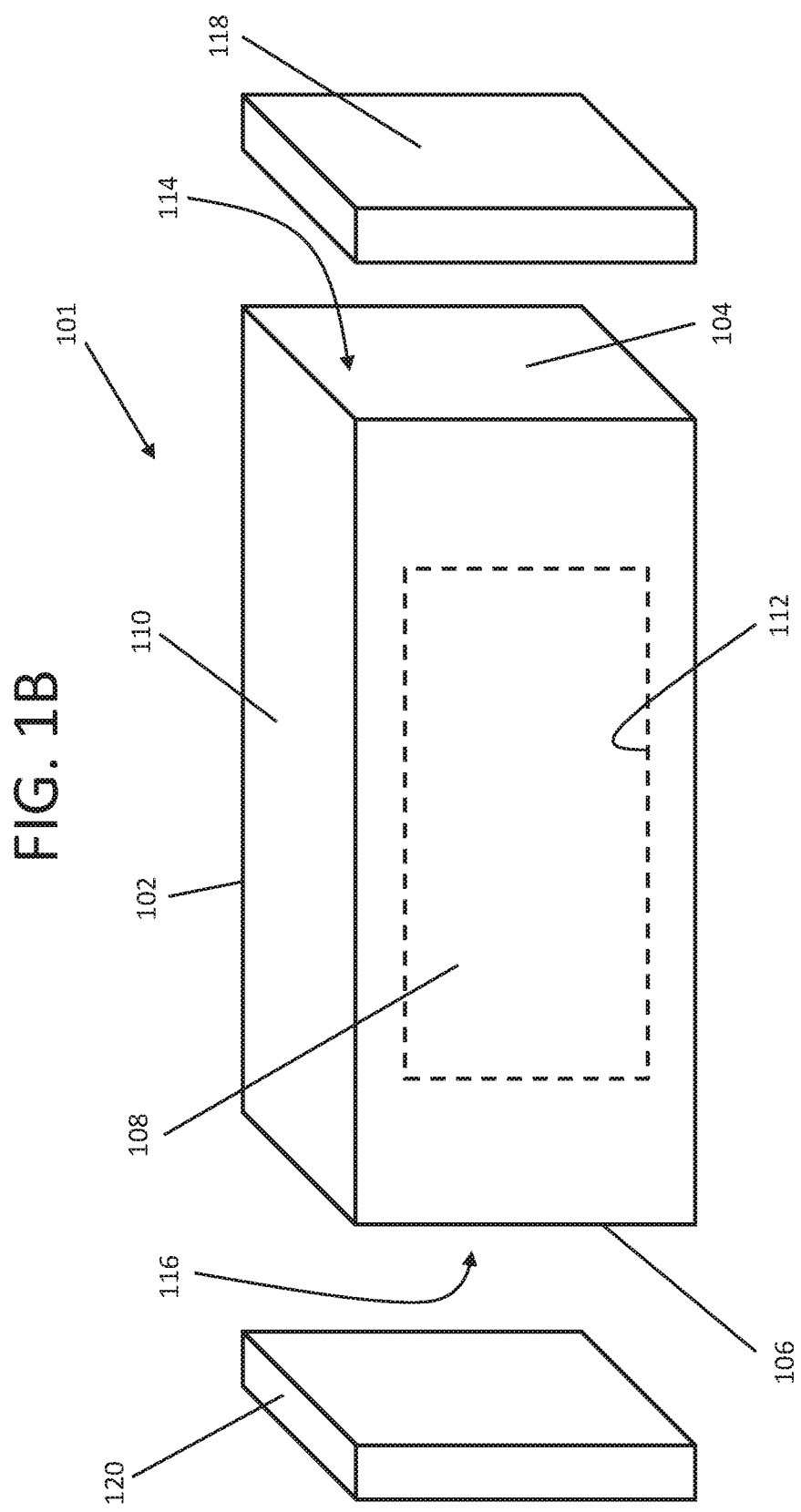

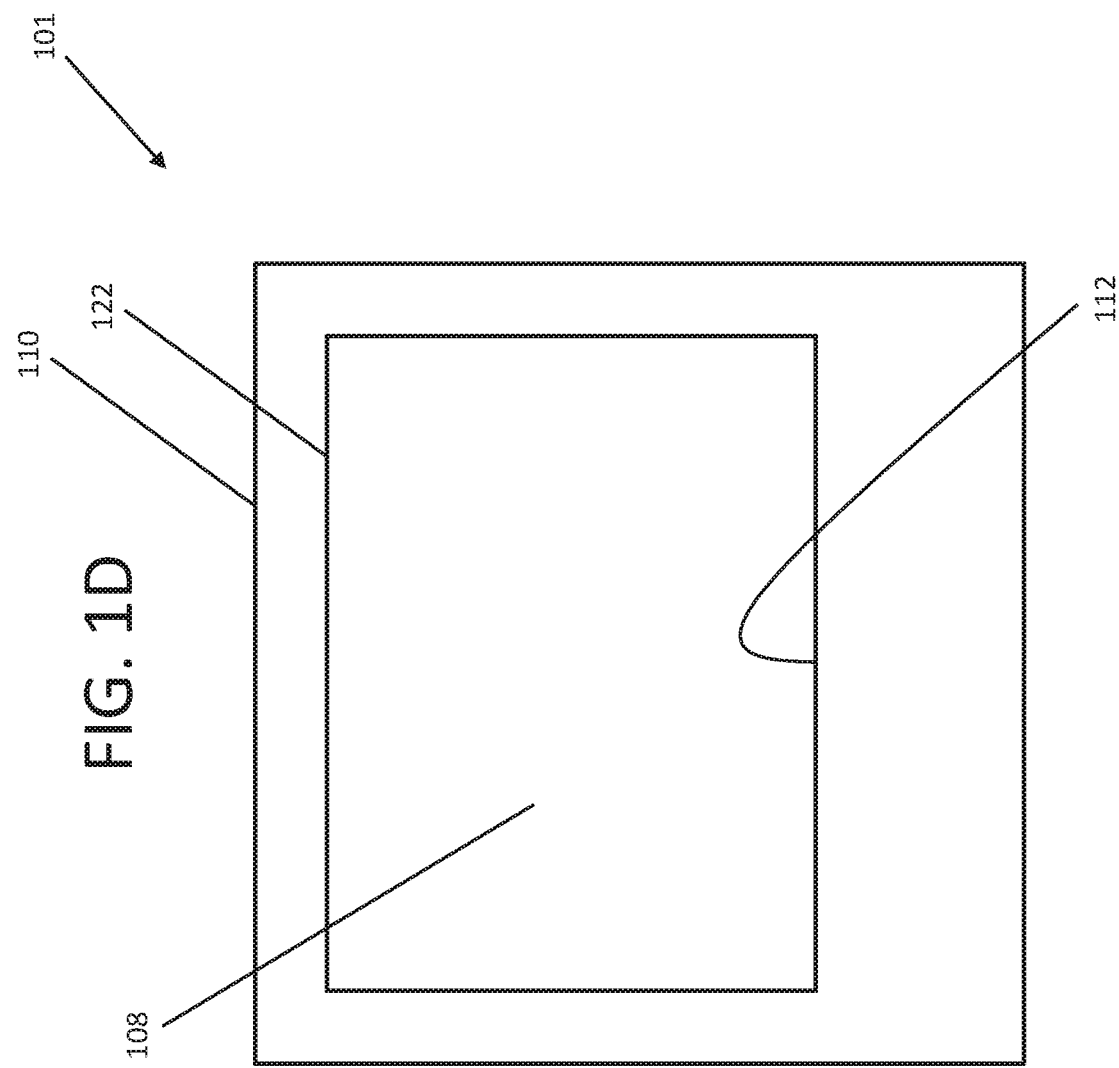

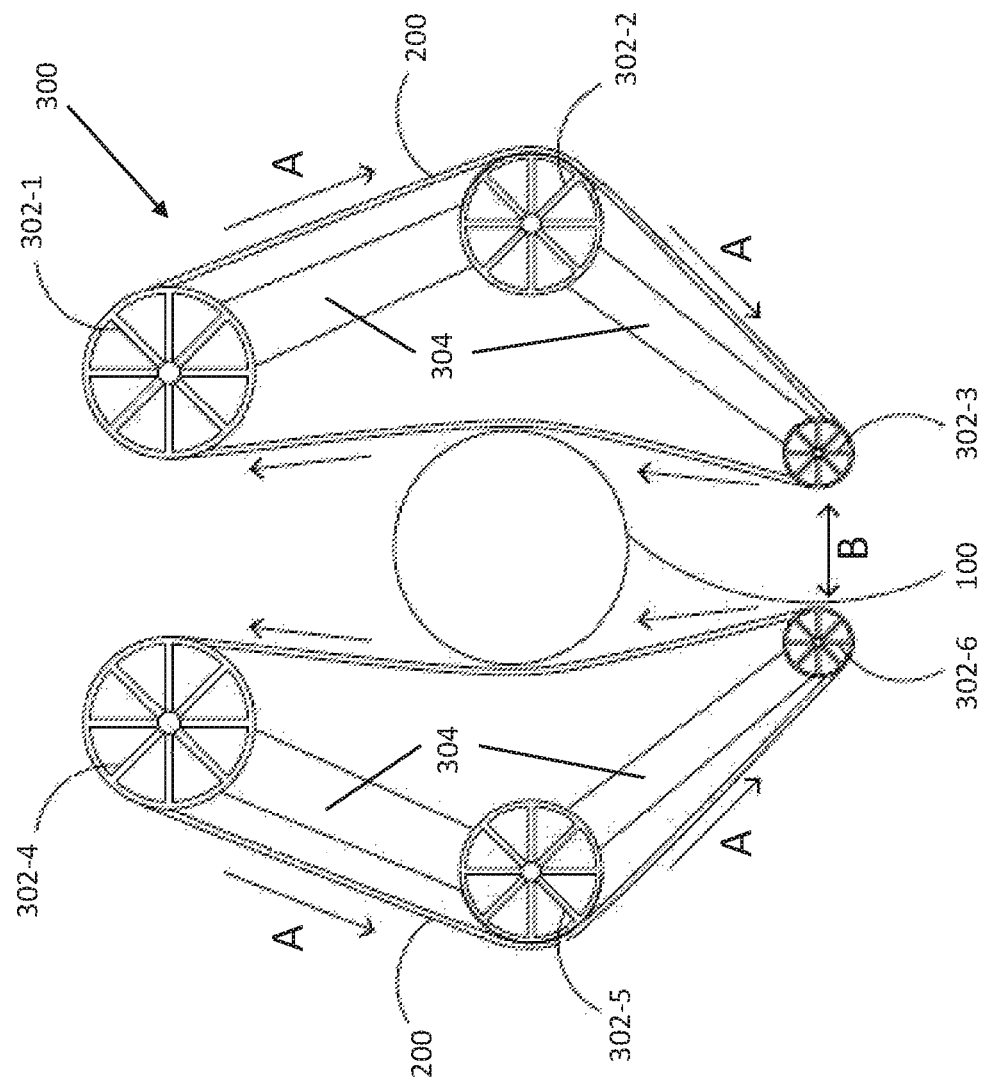

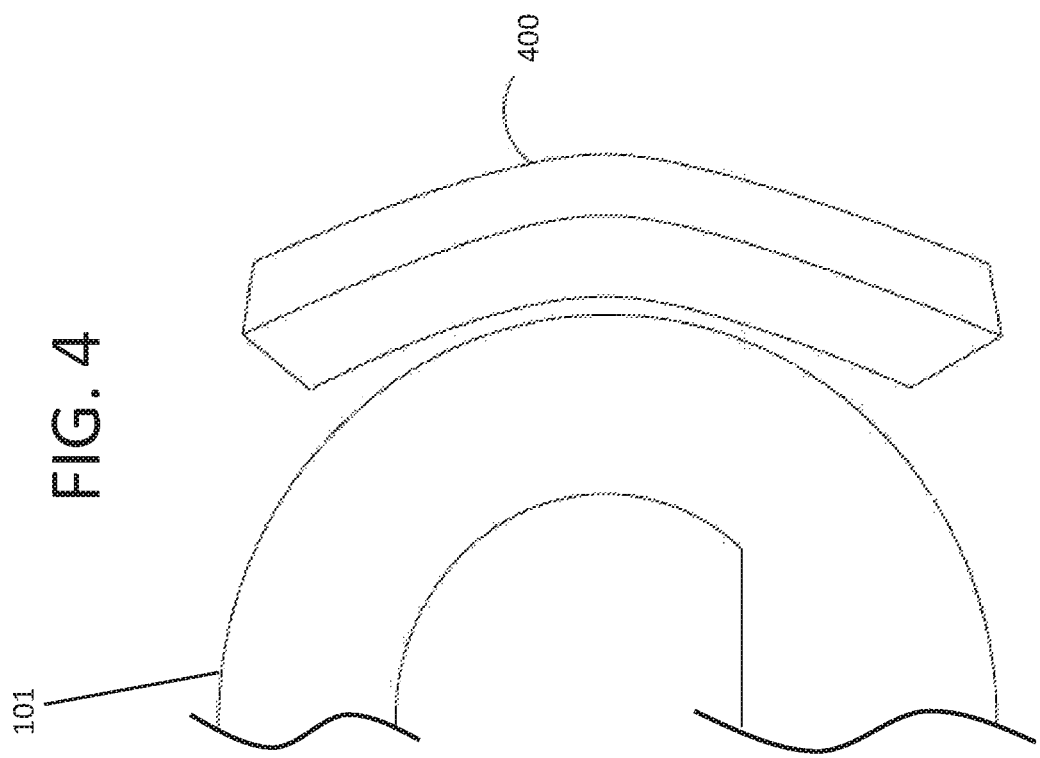

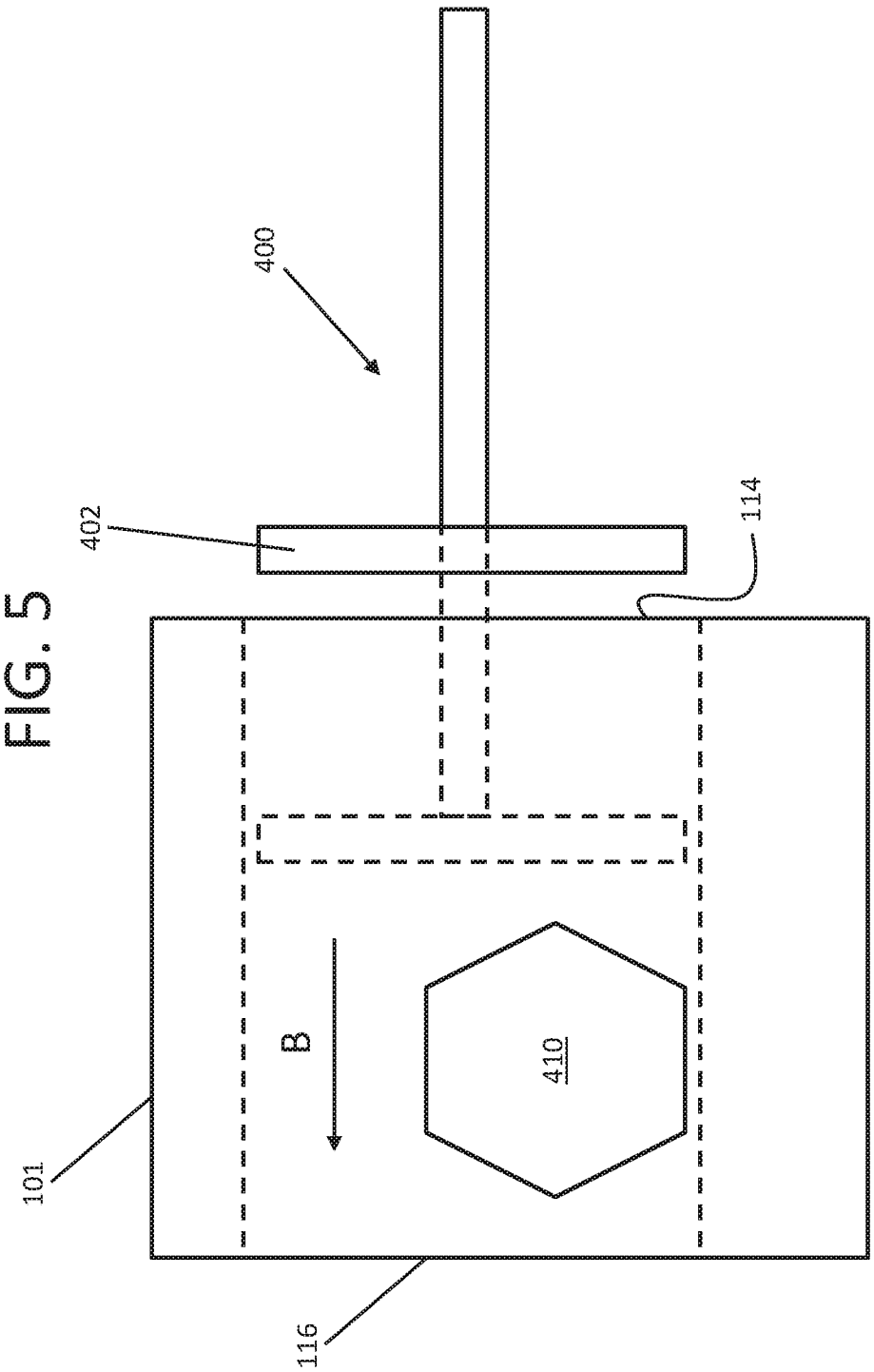

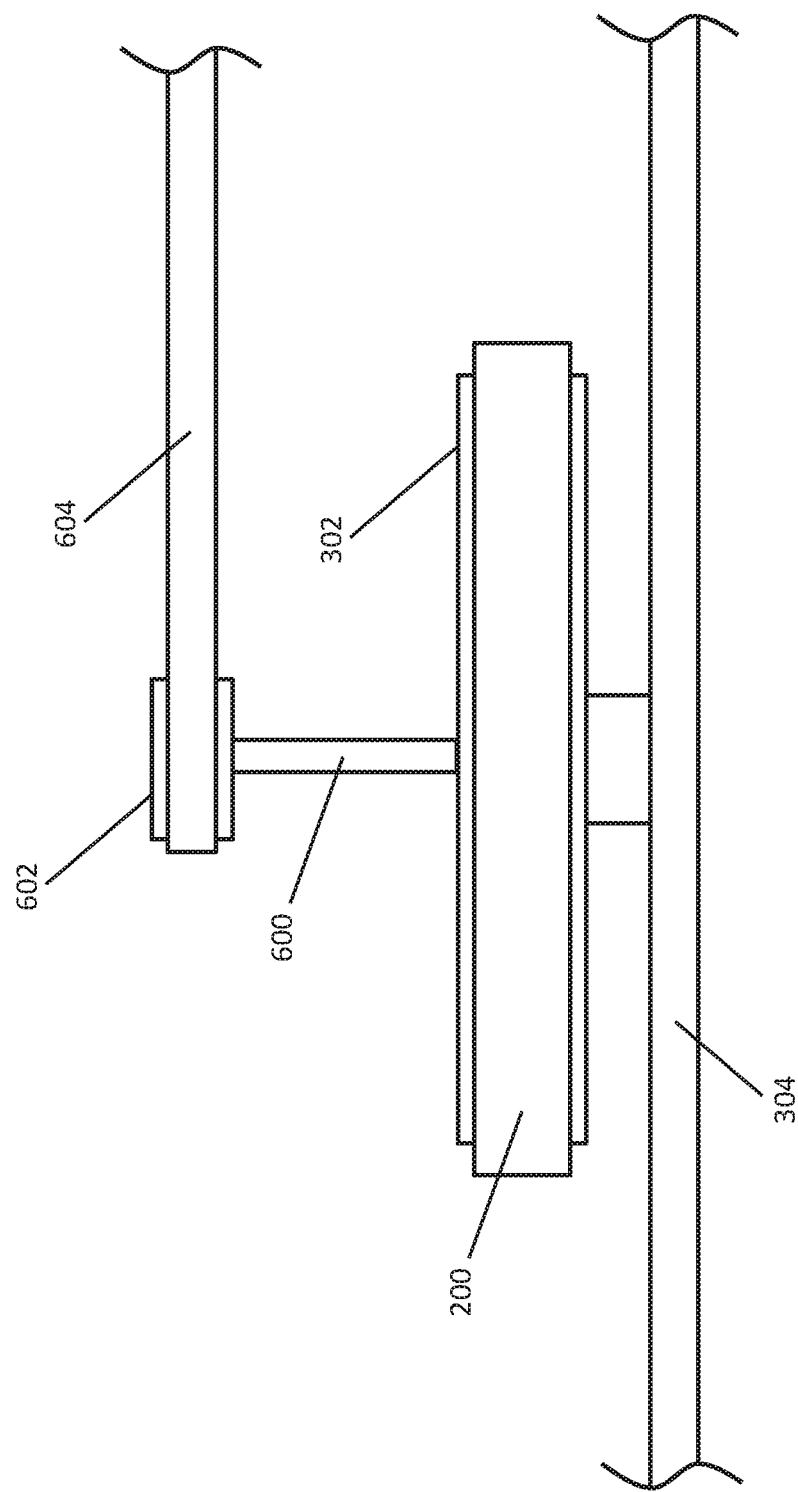

SYSTEM AND METHOD FOR CONVERTING HEAT TO KINETIC ENERGY

CROSS REFERENCE TO RELATED APPLICATIONS

This application is a continuation in part of U.S. patent application Ser. No. 15/205,609, filed Jul. 8, 2016, the entire contents of which are hereby fully incorporated herein by reference for all purposes.

FIELD OF THE INVENTION

The current invention generally relates to the conversion of heat to kinetic energy, and in particular to the use of bimetal bands to convert heat to kinetic energy.

BACKGROUND OF THE INVENTION

It is a well-known fact that clean sources of energy are needed to help protect the environment while supplying energy to those who require it. Examples of clean energy may include solar power, wind power and other types of clean energy.

In addition, wasted energy is commonplace. For example, many manufacturing processes (e.g. smelting) may release vast amounts of heat into the environment without converting the heat to a usable form of power (e.g. electricity). In another example, radioactive waste may emit huge amounts of heat in the form of nuclear particles and waves that are not harnessed and converted into usable forms of power.

Accordingly, there is a need for a system that may provide a new source of clean energy. There is also a need for a system that may be used to harness the vast amount of heat generated as a byproduct from other processes such as manufacturing, radioactive waste, and other types of heat sources.

It is desirable, and an object of this invention, to provide a system that will convert heat to energy in a clean and environmentally safe manner.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIGS. 1A-1D depict aspects of a container that may be a heat source;
FIGS. 3A-3B depict aspects of a heat to energy converter;
FIG. 4 depicts aspects of a buffer plate;
FIG. 5 depicts aspects of a compressor/ejector tool;
and
FIG. 6 depicts aspects of a gear shaft.

DETAILED DESCRIPTION OF THE PREFERRED EMBODIMENTS

Figure 1A:
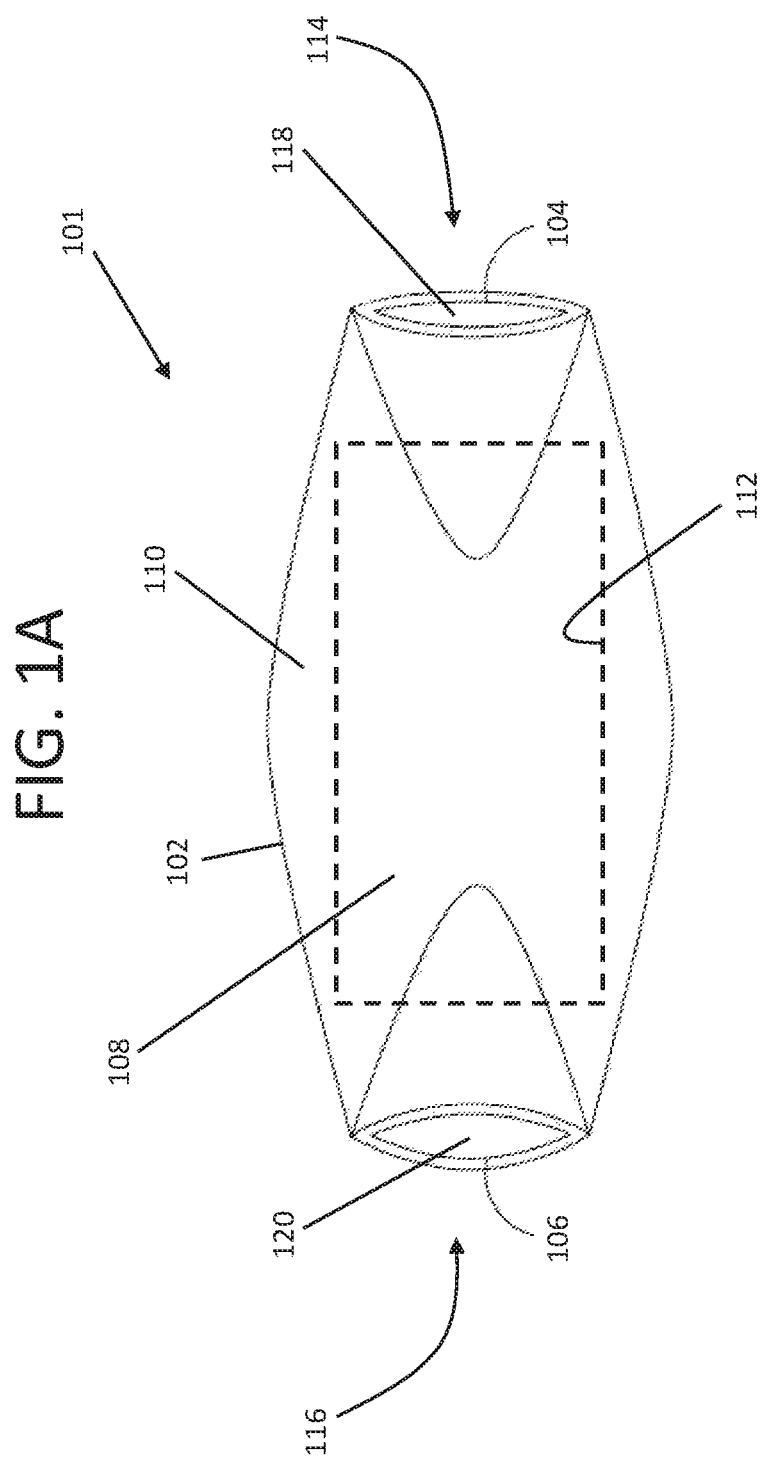

As used herein, unless used otherwise, the following term has the following meaning:

A "mechanism" refers to any device(s), process(es), routine(s), service(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered to be shorthand for the term device(s) and/or process(es) and/or service(s).

The following detailed description is not intended to limit the current invention. Alternate embodiments and variations of the subject matter described herein will be apparent to those skilled in the art.

System 10 according to exemplary embodiments hereof is described with reference to FIGS. 1A-1D, 2, 3A-3B, 4-6. Where the same or similar components appear in more than one figure, they are identified by the same or similar reference numerals.

In general, system 10 may convert heat to kinetic energy. The system 10 may include a heat source and an assembly of bimetal bands that may be in a loop or other configuration and supported on wheels, gears, pulleys or other types of structures (preferable rotating). A portion of the bimetal bands may be exposed to the heat source and as the portion of the bimetal bands absorb the heat, the different metal layers within the bimetallic bands at the heated portion may expand at different rates causing physical displacements within the bands. Then, as the bimetal bands may cool, the different metal layers within the bimetallic bands may contract at a different rate, causing a generally opposite displacement within the bands. These mechanical displacements may cause the loop of bimetal bands to rotate in combination with the support structures (e.g. wheels, gears, etc.) that may in turn be configured with a turbine to turn the turbine and create energy.

For purposes of this specification, the system 10 will be described in reference to examples of the system 10 in operation. In one example of the system 10 in operation, the heat source may be a containment shell that may contain radioactive waste. In another example, the heat source may be a furnace in a smelting facility that may emit excess heat. Yet another example may be a hot springs. It will be apparent to a person of ordinary skill in the art, upon reading this specification, that the system 10 may utilize any type of heat source as a source of heat, and that the scope of the invention is not limited in any way by the particular heat source that may be used.

In one example, the heat source may be radioactive waste material. The radioactive waste may be High Level Waste (HLW) comprising radioactive isotopes in their raw form. The HLW waste may be held in a containment shell that may absorb the emitted radioactive waves and particles (e.g. alpha particles, beta particles, photons, gamma rays, neutrons, etc.) that the waste may emit and convert it to heat. The outer surface of the containment shell may be in physical contact with one or more bimetallic bands that may be held by support structures such as wheels or gears such that the bands may move freely.

In this example, the system 10 may generally include one or more heat sources 100, one or more band assemblies 200, one or more support assemblies 300 and one or more extractor/impactor assemblies 400. The heat sources 100 may include containment assemblies 101 that may contain radioactive waste that may heat the containment shells 101 such that the containers 101 may emit heat and act as heat sources 101. Buffer plates 500 and additional components and/or assemblies may also be included and may be described in later sections.

As depicted in FIG. 1A, the containment assembly 101 may comprise a container body 102 that may include a front end 104, a rear end 106, an inner area 108 (with an inner volume), an outer surface 110 and an inner surface 112. The containment assembly 101 may also include a front opening 114 generally in the front end 104, and a back opening 116 generally in the back end 106. In one example, it may be preferable for the containment assembly 101 to generally be formed in the shape of a torpedo that may have a generally circular cross section with a larger diameter in the middle portion of the body 102 tapering to smaller diameters towards the front end 104 and the rear end 106 of the body 102. The transition from the larger diameter middle portion of the body 102 to the smaller diameter portions of the front and rear ends 102, 104 may be smooth such that the outer surface 110 of the body 102 may be generally smooth and free of ridges, discontinuities, bumps or other types of discontinuities. Note that while FIG. 1A depicts the diameter of the front end 102 and the diameter of the back end 104 to be similar or the same size, this may not be necessary and the diameters of the front end 102 and the rear end 104 may be different.

The torpedo shape described above may be chosen to maximize the surface area of the outer surface 110 that may come into physical contact with the bimetal band assembly 200. However, it should be noted that the containment assembly 101 may comprise other shapes such as a cylinder, a sphere, egg-shaped, a vertically elongated torpedo, a cube, a three dimensional rectangle, or any other shapes or combination of any shapes.

Because the containment assembly 101 may contain radioactive waste that may be at a very high temperature, it may preferably for the containment assembly 101 to be formed of a material that may be very dense and may have a high melting point such as tungsten, molybdenum, lead or other types of suitable materials. The containment assembly 101 may also comprise a combination of different materials that may be in layers (e.g. may have an inner and/or outer lining), in sections or in any other architecture or combination. In addition, the thickness of the walls of the containment assembly 101 may be adequately thick to ensure that the radioactive waste contained with the containment assembly 101 may not damage or otherwise cause the walls of the container 101 to be compromised. In this way, the containment assembly 101 may safely and adequately contain and hold the radioactive waste without being melted, damaged or otherwise have its structure compromised by the heat, weight, or any other properties or characteristics of the radioactive material.

As depicted in FIG. 1A, the containment assembly 101 may also include a front lid 118 that may generally be configured with the front end 104 to close and seal the front opening 114, and a back lid 120 that may generally be configured with the back end 106 to close and seal the back opening 116. The front and back lids 118, 120 may be doors, hatches, lids or any other type of mechanism that may close off and seal the openings 114, 116. It may also be preferable that when lids 118, 120 are configured to seal openings 114, 116 respectively, that the resulting seal prevents any radiation from leaking or otherwise escaping from the containment assembly 101. In one example, the lids 118, 120 may be "tongue and shell" types of lids as depicted in FIG. 1A. In addition, the lids 118, 120 may be secured to the container 101 with bolts, latches or any other attachment mechanism or combinations of attachment mechanisms. In addition, other types and configurations of lids that may adequately seal the front and rear openings 114, 116 of the container 101 from leaking radiation may also be utilized.

It can be seen that the radioactive waste material may be placed into the containment assembly 101 by passing the material through the front or back openings 114, 116. In one example, the back opening 116 may be sealed with back lid 120, and the front opening 114 may be open (e.g. front lid 118 may be removed or displaced, etc.). In this way, the radioactive waste may be placed through the front opening 114 and into the inner volume 108 of the container 101. With the back lid 120 in place covering the back opening 106 of the container 101, the radioactive material may be pushed or otherwise loaded into the inner cavity of the container 101 until the container may be full. Note that it may not be necessary or even desired to completely fill the inner volume 108 of the container 101, but it may be preferable. Note also that the use of a compactor or impactor tool 400 (see FIG. 5) may be required to place, push and otherwise place and position the radioactive waste into the container 101.

Turning attention briefly to FIG. 5, the impactor/compactor tool 400 may include a head 402 that may be inserted into the front opening 114 or rear opening 116 of the container 101, and may push the radioactive waste 410 into the container (for use during operation), or through the container and out the back opening 116 (or the front opening 114 if the tool 400 is inserted into the rear opening 116). In this way, the impactor/compactor tool 400 may be generally used to insert and generally position the radioactive waste 410 into and inside container 101, as well as push the material 410 out of container 101 when it is time to remove the waste 410. In the example depicted in FIG. 5, the tool 400 may be inserted into the front opening 114 of the container 101 and may generally push the waste material 410 in the direction of the arrow B. Note however, that the tool 400 may push or generally position the waste material 410 in any direction, orientation or position as require for operation of the system 10.

It may be preferable that the tool 400 be comprised of materials or other types of materials that may be resistant to the high temperature and other characteristics of the radioactive waste 410 such that the integrity of the tool 400 may not be comprised by the radioactive waste when in use.

It may be preferable that the shape or form of the head 402 of the impactor tool 400 may be such that it may fit inside the front 114 and/or rear openings 116 without obstruction. It may also be preferable that the head 402 of the tool 400 be large enough to adequately move and position the radioactive waste 410 within the container 101.

Note that the description above of the impactor/compactor tool 400 is meant for demonstration purposes and does not limit the scope of the invention in any way. It is appreciated that the system 10 may utilize any type of mechanism necessary and adequate for the insertion, positioning and removal of the radioactive waste into, inside and out of the container 101 respectively. In addition, different tools of different forms and functionalities may be used to perform any and/or all of these different operations and functionalities.

Returning back to FIG. 1A, once the radioactive material may be placed into the container 101, the front lid 118 may be configured to cover and seal the front opening 114 as described above. Note that while the example above described the waste being placed through the front opening 114 while the rear opening 116 may be closed, the reverse may also be performed such that the waste may be pushed through the rear opening 116 while the front opening 114 may be closed.

When the radioactive material is to be removed from the container 101, both the front and rear lids 118, 120 may be removed or generally displaced and the compactor 400 may be placed through the front opening 114 and be used to push the waste from the inner area 108 out through the back opening 116. The waste material may then be moved to another facility or otherwise removed and stored elsewhere. Note also that the reverse may be true and that the compactor 400 may be placed through the rear opening 116 and used to push the waste form the inner area 108 through the front opening 114.

In another example as shown in FIG. 1B, the container 101 may be generally cube shaped, or generally formed as other three dimensional rectangular geometric shapes. In this example, the container 101 may also include a body 102 that may include a front end 104, a rear end 106, an inner area 108 (with an inner volume), an outer surface 110 and an inner surface 112. The containment assembly 101 may also include a front opening 114 generally in the front end 104, and a back opening 116 generally in the back end 106, and front and rear lids 118, 120 as describe in relation to the torpedo shaped container 101 of FIG. 1A. Note that all other aspects described above with relation to the torpedo shaped container of FIG. 1A may also apply to the generally cubed shaped container 101 of FIG. 1B.

It is important to note that the demonstrative description above does not limit the scope of the current invention and that the containment shell 101 may include other forms and/or shapes with other numbers of openings and lids (e.g. three, four or other numbers). In addition, the way that the radioactive waste may be removed from the container 101 may be provided by any means that are known in the art for such an operation, and that the scope of the current invention is not limited in any way by the above description. It is also important to remember that the example described above with reference to the heat source 100 including a container 101 of radioactive waste is meant for demonstration purposes and does not limit the scope of the invention. It is appreciated that any type of adequate heat source 100 may be used in conjunction with the system 10.

Figure 1C:
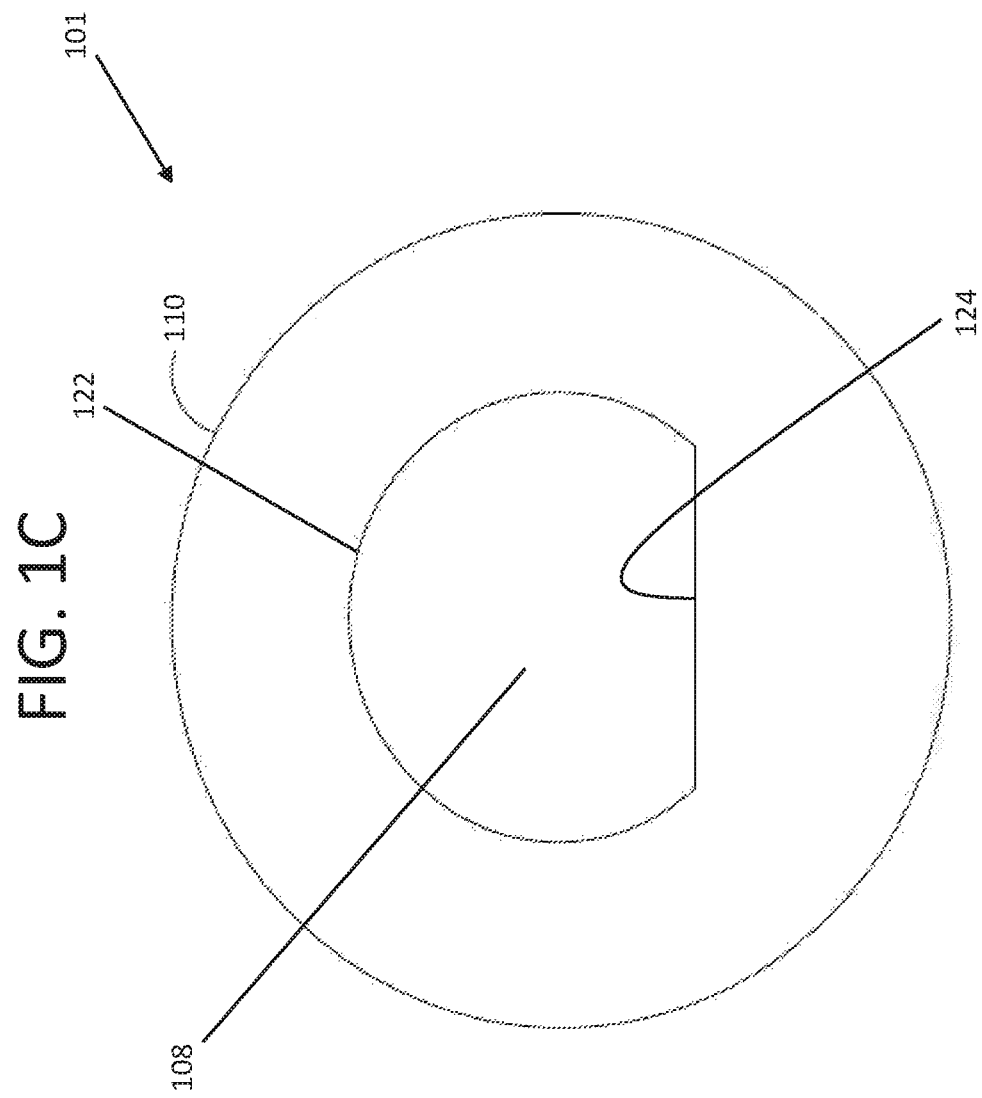

The cross section of the inner cavity 108 of the containment assembly 101 may take any form, such as circular, oval shaped, square, rectangular, triangular, or any other shape or combinations of shapes. In one example as depicted in FIG. 1C with relation to the torpedo shaped container 101 of FIG. 1A, the cross section of the inner compartment 108 of the container 101 may have an upper portion 122 that may be generally circular or curved, and a lower portion 124 that may be generally flat. This may be preferable for the loading and unloading of the radioactive waste such that the waste may be pushed into and out of the container 101 along the flat lower surface 124 that may allow the compactor/impactor tool 400 to more easily push a large volume of the radioactive waste more efficiently. In addition, it can be seen that the thickness of the lower wall of the container 101 (in the area below the lower portion 124) may be thicker than the wall of the container 101 that may be in the area of the upper portion 122. This may allow the container 101 to handle the additional heat that may be transferred to the container 101 during the insertion and removal of the radioactive waste. Note that it may be therefore be preferable for the orientation of the container 101 be generally similar to the orientation depicted in FIG. 1B during the loading and unloading of the waste. However, the shape depicted in FIG. 1B in no way limits the scope of the current invention and the cross-sectional shape of the container 101 may include portions of any forms or shapes, or combinations of any forms or shapes.

In another example, FIG. 1D depicts a possible cross section of the generally cube shaped container 101 of FIG. 1B. Note that this cross section may also include a flat lower portion with a thicker associated container wall beneath it. However, this may not be necessary.

Figure 2:
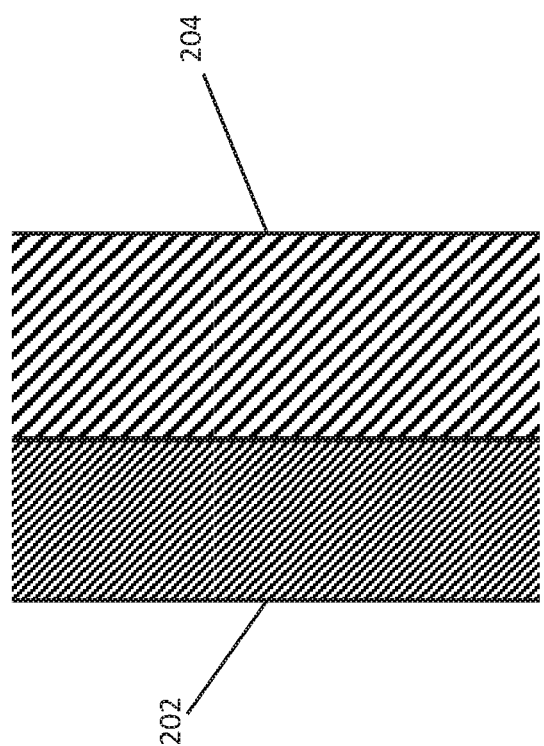
FIG. 2 depicts aspects of a bimetallic band.

Turning now to FIG. 2, the bimetal bands assembly 200 will next be described. As shown and as known in the art, the bimetal band 200 (or ribbon) may be comprised of two separate and distinct layers of metal 202, 204 that may be bonded together as shown (note that only a segment of the bimetal band 200 is depicted in FIG. 2 and that the bimetal band 200 may be much longer and configured into one or more continuous loops). Each layer of metal 202, 204 may be chosen to have distinctly different coefficients of linear expansions compared to the other layer. The layers may be bonded together throughout their length using welding, brazing, riveting or other methods. In one example, one layer may comprise steel and the other layer may comprise copper or brass. Other types of metal layers may also be used. In addition, the metal layers may have the same or similar thickness compared to each other, or may have different thicknesses.

As known in the art, when a strip of bimetal is heated, the bonded layers of metal may expand at different rates causing the strip to bend, arch, or bow, or otherwise mechanically deflect. If the heat is applied to the side of the band with the lesser coefficient of linear expansion, the bimetal strip may bend or generally deflect towards the heat source. If the heat is applied to the side of the band with the greater rate of thermal expansion, the band may bend or generally deflect away from the heat source.

It can be seen that the opposite may be true when the bimetal band may cool. When the band may cool, the side of the band with the faster rate of expansion may also have a faster rate of contraction such that the band may generally return to its initial state once cooled. In addition, if a cold source is applied to the band, it may bend or generally deflect in the opposite direction compared to when a heat source may be applied.

Figure 3B:
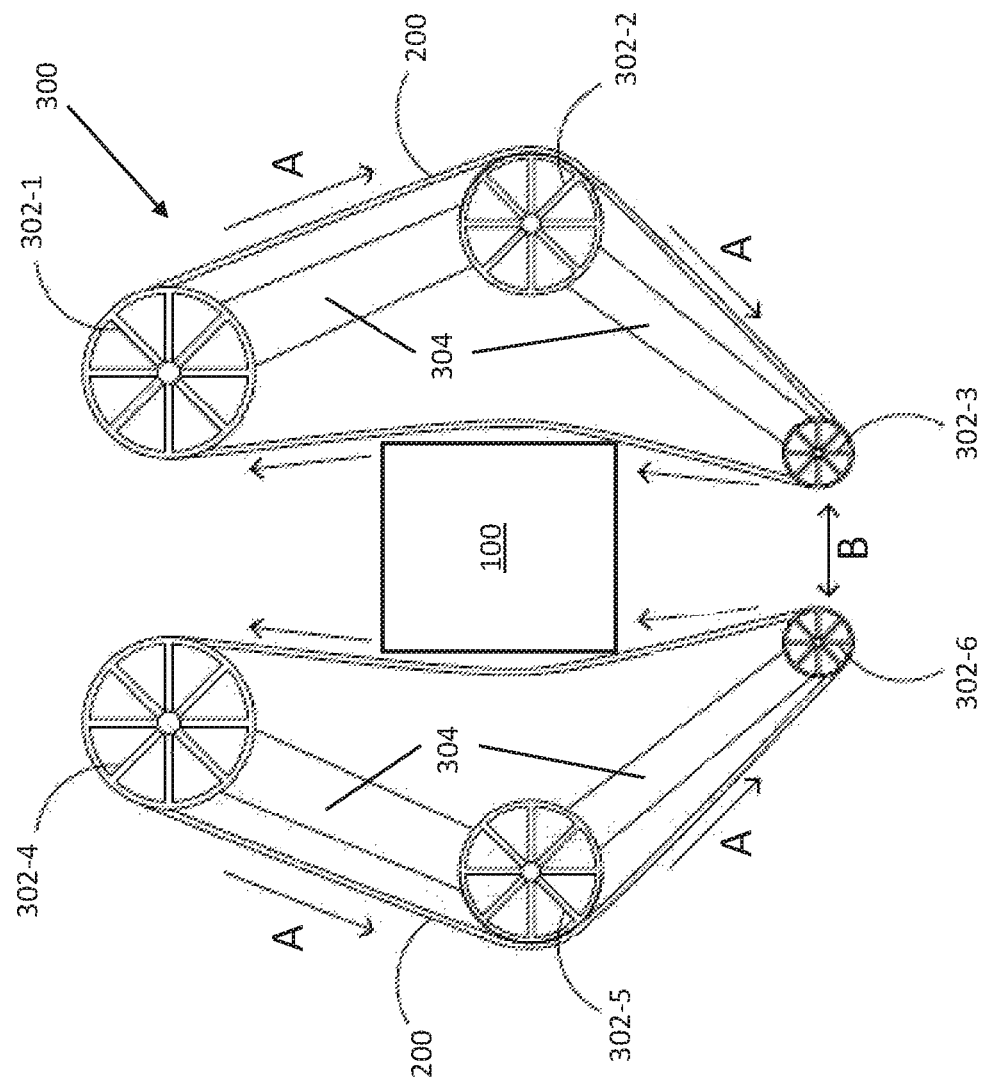

In one example, the bimetal band assembly 200 may generally comprise one or more continuous belts, continuous loops or closed loops of bimetal band material or ribbon (e.g. the two loops of bimetal 200 shown in FIGS. 3A and 3B configured with wheels 302). This will be described in the next section. It should be noted that the bimetal bands assembly 200 may also comprise bimetal wires, bimetal ribbons, or any other architecture of bimetal elements or combinations of different architectures of bimetallic elements.

Turning now to FIG. 3A, the bimetal band assembly 200 may be in the form of one or more continuous belts or continuous loops that may be supported by support assembly 300. Support assembly 300 may generally comprise one or more wheels, pulleys or gears 302-1, 302-2, 302-3 . . . 301-n (collectively and individually 302). The wheels 302 may be configured with one or more bimetal bands 200 such that the closed loop or belts of the bands 200 may be generally supported and held by each gear assembly 300. For example, as shown in FIG. 3A, the support assembly 300 may include two sets of gears or wheels 302, with each set supporting one bimetal loop 200. In this example, wheels 302-1, 302-2 and 302-3 may support one belt 200 and wheels 302-4, 302-5 and 302-6 may support a second belt 200. Note that other numbers of gears 302 may be used to support each band 200 (e.g. two gears, four gears or other numbers of gears), and that other numbers of bands 200 may be supported by the gear assembly 300 (e.g. one band may be supported, three bands may be supported or other numbers of bands may be supported).

It may be preferable that the bimetal bands 200 are supported adequately by each set of gears 302 such that the bands do not fall off or otherwise become derailed or dislodged from the gear assembly 300. Accordingly, it may also be preferable for the surface forming the outer circumference of each gear 302 be a width that may generally support the bimetal band 200 as shown. In addition, the surface forming the outer circumference of each gear 302 may also include a circumferential channel with side walls or a circumferential groove that a length of the bimetal band 200 may generally rest inside as the bimetal band 200 is generally supported by each wheel 302. This may assist in keeping the bimetal band 200 from falling off or otherwise becoming detached from each wheel 302 as it is supported.

The gears or wheels 302 of the support assembly 300 may preferably be free to spin (e.g. about their center axis) such that the bimetal loop 200 may also be free to rotate in combination with the rotating gears 302. In this way, it can be seen that if the bimetal loops 200 are caused to move (i.e. rotate on the gears 302) the gears 302 will also spin in combination with the loops 300. This may allow the bands 200 and the wheels 302 of the support assembly 300 to rotate together in combination as shown by the arrows A in FIG. 3A. Note that it may be preferable that the bimetal loops 300 and the wheels 302 be free to spin clockwise or counter clockwise, or in any direction, such the loops 200 and the wheels 302 may also rotate in a direction opposite arrows A in FIG. 3A.

The support structure 300 may also comprise one or more frames 304 that may support the axles of each wheel 302 such that each wheel 302 may rotate freely without obstruction. The support structure frame 304 may be adequately stable such that the rotation of each wheel 302 may also be stable and strong. The support structure 300 may comprise a single frame 304 for each set of wheels 302 or multiple frames 304 for each set of wheels 302 that may be configured together to generally form the overall support structure 300. It can be seen that the support frames 304 may be of any form, shape, architecture or of any configuration that may adequately support the wheels 302 as the wheels 302 rotate configured with the bimetallic bands 200.

In addition, the support frames 304 that may support the wheels 302 may be configured to move or otherwise configure the positions of each wheel 302 relative to each other wheel 302 and to the container 101 as needed in real time. In this way the support structure 300 may position the wheels 302 to adjust the tension of the bimetallic bands 200 that may be configured to rotate in combination with the wheels 302. In addition, the support structure 300 may position the wheels closer or further away from the heat source that may in turn position the bimetallic bands 200 closer or further away from the heat source as required by the system 10.

In some scenarios, such as in the example described below, the support assembly 300 may adjust the position of the wheels 302 in order to adjust the pressure that the bimetallic bands 200 may apply to the heat source as the bimetallic bands 200 come into contact with the heat source. In this way, the surface area of the point of contact between the bimetallic bands 200 may also be adjusted as the pressure may be increased or decreased. This may also adjust the amount of heat that may be transferred to the bimetallic heat bands 200 and the friction that may exist between the bands 200 and the heat source. This positioning may also adjust or generally affect the rotational speed (RPM) of the bimetallic bands 200 rotating in conjunction with wheels 302. An example of this movement may be represented by arrows B in FIGS. 3A and 3B.

The support structure 300 and the bimetal band assembly 200 as described above may be configured with one or more containment assemblies 101. As shown in FIG. 3A, in one example, the support structures 300 and the bimetal bands 200 may be configured with the torpedo shaped container 101 of FIG. 1A such that a portion or segment of the bands 200 may come into physical contact with one or more sides of the container 101 (e.g. with a portion of the outer surface 110 of the container 101). As described above, the radioactive waste within the container 101 may act to heat the container 101, and in this way, the container 101 may in turn heat the segments of the bimetal bands 200 that may come into physical contact with the heated container 101. In this way, the bands 200 may receive heat from the container by conduction (and by convection in the areas immediately adjacent to the point of contact between the container and the bands 200). Accordingly, the heated container 101 may act as the heat source to system 10.

In one example, the bimetallic band 200 may be configured with the container 101 with the side of the band 200 with the greater coefficient of linear expansion facing away from the container 101. As described, the portion of the bimetal band 200 that may be in contact with the outer surface 110 of container 101 in a particular moment in time may absorb the heat emitted by the container 101 and mechanically deflect (bend) towards the heat source (the container 101). Note that only the portion of the band 200 in contact with (or in close enough proximity with container 101 to absorb heat that may be transferred by conduction or emitted by convection) the container 101 will deflect. Also, if the band may be rotating in combination with support assembly 300 (e.g. in the direction of arrows A), the moment the heated portion of the band 200 moves past the container 101 and is no longer heated by the container 101, the band 200 may cool due to the colder temperature of the environment (compared to the temperature of the container 101). As the heated portion of the band 200 may cool, it may return to its original non-deflected (non-bent) state.

However, it can be seen that after the first portion of band 101 is heated by the container 101 and then moves past the container 101 and is cooled by the environment, the next portion of the rotating band 200 may next be in contact with the outer surface 110 of the container 101 and be heated thereby. This next portion of band 200 may thereby deflect towards the heat source, and return back to its original non-deflected state (non-bent) as it moves past the heated container 101 due to the continual rotation of the band 200.

In this way, there may be a continual cycle of instantaneous portions of the band 200 being heated by the container 101 (and deflecting towards the heat source) and then being immediately cooled by the environment (and bending back to its original state) as the band 200 rotates in combination with support wheel assembly 300.

This back-and-forth bending motion of each instantaneous heated and cooled portion of the bimetal band 200 may create forces within the band 200 that may propel the band 200 to rotate along the support wheels 302. Vectorially speaking, as the each portion of the band 200 is heated, a force vector is set up within the heated portion of the band 200 at the point of contact with the outer surface 110 of the container 101 that may tend to arch the band 200 towards the container 101. This force vector may be geometrically made up of a force vector that may be generally normal (perpendicular) to and pointing into the outer surface 101 of the container at the point of contact, and a force vector that may be generally tangential to the surface 110 of the container 101 at the point of contact with the band 200. Then, as the heated segment of band 200 moves past the container 101 and is cooled by the environment, the heated portion 200 may bend back to its original state, thus setting up another force vector that may generally be a mirror image of the first force vector. This second force vector may be geometrically made up of a force vector that may be generally normal to and pointing away from the container 101, and a force vector that may generally be tangential to the container 101.

It can be seen that in both the heating and the cooling of the bimetallic band 200, that each force vector that may be created during this process may include a force vector that may be generally tangential to the container 101, such that these force vectors may tend to propel the bimetallic loop 200 to rotate about in combination with the support assembly 300.

Note that the bimetallic loop 200 may rotate in the direction of the arrows A in FIG. 3A, or in the direction generally opposite the arrows A. In addition, the loop 200 may be initially nudged in the first moment of exposure to the heat source in the direction that the operator of the system 10 may desire for the bands 200 to rotate, but this may not be necessary. In addition, it may be preferable for each bimetallic loop 200 to be generally taught while supported by the support assembly 300 so that as the bands 200 may rotate in combination with the wheels 302, there may not be unnecessary slack in the loops 200. It may also be preferable that the loops 200 be not too tight wound on the support wheels 302 such that the rotation of the loops 200 may not be compromised.

As the bands 200 may pass over the heated container 101, it may be preferable to provide lubrication to the point of contact in order to minimize the wear that may be induced to the bands 200 and the outer surface 110 of the container 101 due to friction during use. In addition, this lubrication may minimize the frictional component that may cause the slow down or otherwise decrease the ability of the band 200 to rotate. It may be preferable for the lubrication to be able to withstand the high temperature of the container 100 as well as the friction that may occur. It may also be preferable for the outer surface 110 of the container 101 as well as the surfaces of the bimetal bands 200 to be smooth and durable in order to minimize and withstand any friction between the components 101, 200.

In addition, the system 10 may include at least one interchangeable buffer plate 400 that may be generally configured with the outer surface 110 of the container 101, preferably in the areas of contact between the container 101 and the bimetallic bands 200. The buffer plates 400 may be formed with a material, or a combination of materials, that may withstand the temperature of the container 101 and not melt, disfigure or otherwise be compromised by the temperature of the container 101. For example, the side of each buffer plate 400 that may be in contact with the container 101 may have a layer of material that may be highly temperature resistant. Note that it may be preferable that the buffer plates 400 have a high coefficient of heat transfer such that the plates 400 may efficiently transfer the heat from the container 101 to the bands 200 without loss of energy.

In addition, the buffer plates 400 may also be formed of materials or combinations of materials that may withstand the abrasion and/or friction that may occur due to the interaction of the bimetallic bands 200 and the outer surface 110 of the container 101. For example, the outer surface of the buffer plates 400 that may be in contact with the rotating bands 200 may comprise a material with high friction durability. Also, it may be preferable that the outer surface of the plates 400 be smooth such that the bands 200 may travel over the outer surface of the buffer plates 400 without compromising and excessive friction. In this way, the buffer plates 400 may be durable and may minimize the wear of the system 10, enhancing its longevity and improving its efficiency.

The buffer plates 400 may be attached to the outer surface 110 of the container 101 by the use of bolts, latches, screws, welding, or by other attachment members or mechanisms. Note that the buffer plates 400 may be incorporated into the container 101 and/or may or may not be necessary.

In another example as described above and depicted in FIG. 3B, the container may be generally cube shaped with sides that may generally be flat. In this way, the bimetallic bands 200 may be configured with the container 101 to pass is very close proximity to the outer surfaces 110 of the container 101, but may only make minimal physical contact with, or possibly no actual physical contact at all, with the container 101. This architecture may minimize the friction that may occur between the bands 200 and the outer sides 110 of the container 101. The outer corners and edges of the container 101 may also be rounded to further minimize friction or snag between the bands 200 and the container, but this may not be necessary.

Note that in this example, it may be preferable that the bands 200 run extremely close to the outer surface of the container 101 in order to absorb the heat that the container 101 may be emitting. In one example, the bands 200 come into physical contact with the surfaces 110 but in a way (e.g. with low pressure exerted against the container 101) that the friction may be minimized. In this way, the bands may receive the heat by conduction at the points of contact (and by convection in the areas immediately adjacent to the points of contact between the container and the bands 200). In another example, the bands 200 may pass by the surface 110 in very close proximity (e.g. less than one millimeter) such that the bands may generally receive the heat from the container by convection (and by conduction is the bands intermittently come into physical contact with the container due to any lateral movement during rotation). Note also that the bands 200 may be configured with the container 101 such that the bands may intermittently be in physical contact with the container 101 at some moments in time and intermittently in close proximity to the container 101 at other moments in time, or in any combination thereof.

It is seen by this example that system 10 may convert heat into kinetic energy. The example above was chosen to demonstrate the general structure and functionality of the system 10 and in no way limits the system 10. It will be appreciated by a person of ordinary skill in the art, upon reading this specification, that the system 10 may be applied to any type of heat source, or any combination of heat sources, to convert the heat provided by the heat source to the movement and rotation of the bimetallic bands 200 (i.e. kinetic energy).

Note that the kinetic energy of the rotating wheels 302 may be used for a variety of purposes, including for example, to be converted into electricity. In one example of this, the rotating wheels 302 may be configured with a dynamo generator, a magneto generator or any other types or combinations of types of generators to convert the kinetic energy of the rotating wheels 302 to power. In the case of a dynamo generator, the kinetic energy may be converted into direct current (DC), and in the case of a magneto generator, the kinetic energy may be converted into alternating current (AC).

In one example as depicted in FIG. 6, one or more wheels 302 may be configured with a gear shaft 600. The gear shaft 600 may be generally configured with the spinning axle of each wheel 302 such that the spinning axle of the wheel 302 may in turn rotate the gear shaft 600 thereby. Note that the gear shaft 600 may be also be configured with other components or elements of the wheels 302 and/or the support assembly 300 that may allow the rotating band 200 to transfer its rotation to the gear shaft 600. The rotating gear shaft 600 may rotate at the same rotations per minute (rpm) as the axle of the wheel 302, or at a different rate.

The spinning gear shaft 600 may be configured with a top gear 602 that may be a gear, sprocket, wheel or other type of mechanism that may be configured with the spinning gear shaft 600 to transfer the kinetic energy of the spinning gear shaft 600 to another mechanism. In the case of a top gear 602, the top gear 602 may be configured with a band 604 that may be a band, a cable, a wire, a ribbon or other type of structure that may be rotated by the top gear 602. The rotating band 604 may then lead to a dynamo generator, a magneto generator, a turbine or other type of power generating device, and may rotate the power generating device (or at least one component of the power generating device) such that the transferred rotation may be converted to power by the power generating device. In this way the kinetic energy of the spinning wheel 302 may be transferred to the gear shaft 600, to the top gear 602, to the band 604 and then to a power generating device to be converted into power or energy. The resulting power may be used to charge a rechargeable battery or fuel cells, or may be used to power other devices.

It should be noted that the gear shaft 602, the top gear 604 and/or the band 604 may also be configured with other types of devices that may utilize the kinetic energy for other purposes such as a propeller to create air flow, a tire or wheel to create movement or other types or combinations of types of other devices for other purposes.

Other types of mechanisms may also be configured with gear shaft 600 such as a beveled gear that may be configured with another beveled gear or other mechanism to transfer the kinetic energy from the gear shaft 600 to an external device. Note that the examples given above regarding how the kinetic energy of the spinning wheels 302 of the system 10 are given for demonstration purposes and in no way limit the scope of the system 10. It is apparent that the kinetic energy of the rotating wheels 302 may be transferred by any adequate means to another device to be converted into power or energy, or to be used for other purposes.

It should be noted that the containment shell 101 described above may preferably be configured behind a safety barrier so that in the event that radiation may be inadvertently released from the containment assembly 101 that it will be contained within the safety barrier. In this way, the operators of the system 10 may not be placed in danger. The system 10 may also include safety glass or other type of transparent material such that the positioning of the radioactive waste within the system 10 may be viewed during operation. Remote video cameras positioned within or in close proximity of the containment shell 101 may also provide real time images of the process during operation.

In general, it is clear that the system 10 may convert heat into kinetic energy and that the examples above were chosen to demonstrate the general structure and functionality of the system 10 and in no way limits the system 10. Other examples of heat sources 100 that may be used in conjunction with system 10 may include furnaces in a smelting facility that may emit excess heat, hot springs, solar mirrors or any type of heat source 100, or any combination of heat sources 100. In any event, the system 10 may be configured with any type of heat source 100 to convert the heat provided by the heat source 100 to the movement and rotation of the bimetallic bands 200 (i.e. kinetic energy).

As used herein, including in the claims, the phrase "at least some" means "one or more," and includes the case of only one. Thus, e.g., the phrase "at least some ABCs" means "one or more ABCs," and includes the case of only one ABC.

As used in this description, the term "portion" means some or all. So, for example, "A portion of X" may include some of "X" or all of "X". In the context of a conversation, the term "portion" means some or all of the conversation.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

Although certain presently preferred embodiments of the invention have been described herein, it will be apparent to those skilled in the art to which the invention pertains that variations and modifications of the described embodiments may be made without departing from the spirit and scope of the invention.

What is claimed is:

1. A system for converting heat to kinetic energy, the system comprising:
   a heat source;
   at least one bimetallic band; and
   at least one wheel configured with the at least one bimetallic band;

wherein at least a portion of the heat source is in physical contact with at least a portion of the at least one bimetallic band, and wherein heat from the heat source propels the at least one bimetallic band causing the at least one wheel to rotate.

2. The system of claim 1 wherein the at least one bimetallic band is a continuous loop.

3. The system of claim 1 further comprising at least one gear shaft configured with the at least one wheel.

4. The system of claim 3 wherein the at least one wheel rotates the at least one gear shaft, and the at least one gear shaft rotates at least one power generating device that converts the rotations to power.

5. The system of claim 1 wherein the heat source is a container of radioactive waste material.

6. The system of claim 1 further comprising a buffer plate configured with the container of radioactive waste material at the point of contact between the at least one bimetallic band and the container of radioactive waste material.

7. A system for converting heat to kinetic energy, the system comprising:
    a heat source;
    at least one bimetallic continuous loop;
    at least one wheel configured with the at least one bimetallic continuous loop; and
    at least one gear shaft configured with the at least one wheel;
    wherein at least a portion of the heat source is in physical contact with at least a portion of the at least one bimetallic continuous loop, and wherein heat from the heat source propels the at least one bimetallic continuous loop causing the at least one wheel to rotate, which rotates the at least one gear shaft.

8. The system of claim 7 wherein the at least one gear shaft rotates at least one power generating device that converts the rotations to power.

9. The system of claim 7 wherein the heat source is a container of radioactive waste material.

10. The system of claim 9 further comprising a buffer plate configured with the container of radioactive waste material at the point of contact between the at least one bimetallic band and the container of radioactive waste material.

11. A system for converting heat to kinetic energy, the system comprising:
    a container of radioactive waste material;
    at least one bimetallic continuous loop;
    at least one wheel configured with the at least one bimetallic continuous loop; and
    at least one gear shaft configured with the at least one wheel;
    wherein at least a portion of the container of radioactive waste material is in physical contact with at least a portion of the at least one bimetallic continuous loop, and wherein heat from the heat source propels the at least one bimetallic continuous loop causing the at least one wheel to rotate which rotates the at least one gear shaft.

12. The system of claim 11 wherein the at least one gear shaft rotates at least one power generating device that converts the rotations to power.

13. The system of claim 11 further comprising a buffer plate configured with the container of radioactive waste material at the point of contact between the at least one bimetallic band and the container of radioactive waste material.

14. The system of claim 1 further comprising a support assembly configured with the at least one bimetallic band, and that adjusts the amount of surface area at the point of contact between the at least a portion of the heat source and the at least a portion of the at least one bimetallic band.

15. The system of claim 7 further comprising a support assembly configured with the at least one bimetallic continuous loop, and that adjusts the amount of surface area at the point of contact between the at least a portion of the heat source and the at least a portion of the at least one bimetallic continuous loop.

16. The system of claim 11 further comprising a support assembly configured with the at least one bimetallic continuous loop, and that adjusts the amount of surface area at the point of contact between the at least a portion of the container of radioactive waste material and the at least a portion of the at least one bimetallic continuous loop.

* * * * *